(12) United States Patent
Bradley

(10) Patent No.: US 11,150,370 B2
(45) Date of Patent: Oct. 19, 2021

(54) DIRECTIONAL NEAR WELLBORE IMAGING VISUALIZATION

(71) Applicant: Thomas Bradley, Den Helder (NL)

(72) Inventor: Thomas Bradley, Den Helder (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 219 days.

(21) Appl. No.: 16/431,379

(22) Filed: Jun. 4, 2019

(65) Prior Publication Data

US 2019/0377098 A1 Dec. 12, 2019

Related U.S. Application Data

(60) Provisional application No. 62/681,521, filed on Jun. 6, 2018.

(51) Int. Cl.
| | | |
|---|---|---|
| *G01V 1/30* | (2006.01) | |
| *G01V 1/50* | (2006.01) | |
| *G06T 7/70* | (2017.01) | |

(52) U.S. Cl.
CPC .............. *G01V 1/307* (2013.01); *G01V 1/50* (2013.01); *G06T 7/70* (2017.01); *G01V 2210/63* (2013.01); *G06T 2207/20108* (2013.01)

(58) Field of Classification Search
CPC ...... G01V 1/307; G01V 1/50; G01V 2210/63; G01V 2210/62; G01V 2210/64; G06T 7/70; G06T 2207/20108
See application file for complete search history.

(56) References Cited

U.S. PATENT DOCUMENTS

| | | | |
|---|---|---|---|
| 6,268,911 B1* | 7/2001 | Tubel | E21B 23/03 356/72 |
| 10,267,941 B2* | 4/2019 | Collins | G01V 1/50 |
| 2004/0158997 A1* | 8/2004 | Tang | E21B 47/026 33/304 |
| 2008/0151690 A1* | 6/2008 | Tang | G01V 1/44 367/35 |
| 2011/0180327 A1* | 7/2011 | Bittar | E21B 47/092 175/61 |
| 2012/0287757 A1* | 11/2012 | Angelsen | G01V 1/375 367/178 |
| 2012/0320712 A1 | 12/2012 | Aqrawi et al. | |

(Continued)

FOREIGN PATENT DOCUMENTS

WO 2016185223 A1 11/2016

OTHER PUBLICATIONS

International Search Report and Written Opinion; PCT/US2019/035474; dated Sep. 20, 2019; 8 pages.

*Primary Examiner* — Mohammad K Islam
(74) *Attorney, Agent, or Firm* — Cantor Colburn LLP

(57) ABSTRACT

A system and a computer-implemented method of evaluating a formation. The system includes a plurality of acoustic transmitters and acoustic receivers and a processor. Acoustic data is obtained from the formation using the plurality of acoustic transmitters and acoustic receivers. The acoustic data is projected into a plurality of image planes and a feature in one of the image planes is selected. The plurality image planes are scrolled through in order to determine the three-dimensional structure of the feature. The formation is drilled based on the three-dimensional structure of the feature.

15 Claims, 7 Drawing Sheets

(56) References Cited

U.S. PATENT DOCUMENTS

| | | |
|---|---|---|
| 2014/0056111 A1* | 2/2014 | Vu ....................... E21B 47/005 |
| | | 367/180 |
| 2017/0108606 A1 | 4/2017 | Gorban et al. |
| 2018/0031723 A1* | 2/2018 | Przebindowska ........ G01V 1/46 |
| 2019/0101663 A1* | 4/2019 | Walters .................... G01V 1/44 |
| 2019/0129053 A1* | 5/2019 | Wang ..................... G01V 1/284 |
| 2019/0187316 A1* | 6/2019 | Mathiszik ............. E21B 47/095 |

* cited by examiner

DIRECTIONAL NEAR WELLBORE IMAGING VISUALIZATION

CROSS REFERENCE TO RELATED APPLICATIONS

This application claims priority to U.S. Provisional Application Ser. No. 62/681,521, filed on Jun. 6, 2018, the contents of which are incorporated herein by reference in their entirety.

BACKGROUND

In the resource recovery industry, deep shear wave imaging is used to determine and locate geological structures in a formation. The data obtained using acoustic wave is three-dimensional, but is often displayed in a two-dimensional formation that omits the majority of the data. Therefore, there is a need to display acoustic wave data that allows evaluation of the formation based on three-dimensional data.

SUMMARY

In one aspect, a computer-implemented method of evaluating a formation is disclosed. the method including: obtaining acoustic data from a plurality of acoustic transmitters and acoustic receivers in the formation; projecting the acoustic data into a plurality of image planes; selecting a feature in one of the image planes; scrolling through the plurality image planes to determine the three-dimensional structure of the feature; and drill the formation based on the three-dimensional structure of the feature.

In another aspect, a system for evaluating a formation is disclosed, the system including: a plurality of acoustic transmitters and acoustic receivers; and a processor configuration to: project the acoustic data obtained from the plurality of acoustic transmitters and acoustic receivers into a plurality of image planes, select a feature in one of the image planes, scroll through the plurality image planes to determine a three-dimensional structure of the feature, and drill the formation based on the three-dimensional structure of the feature.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
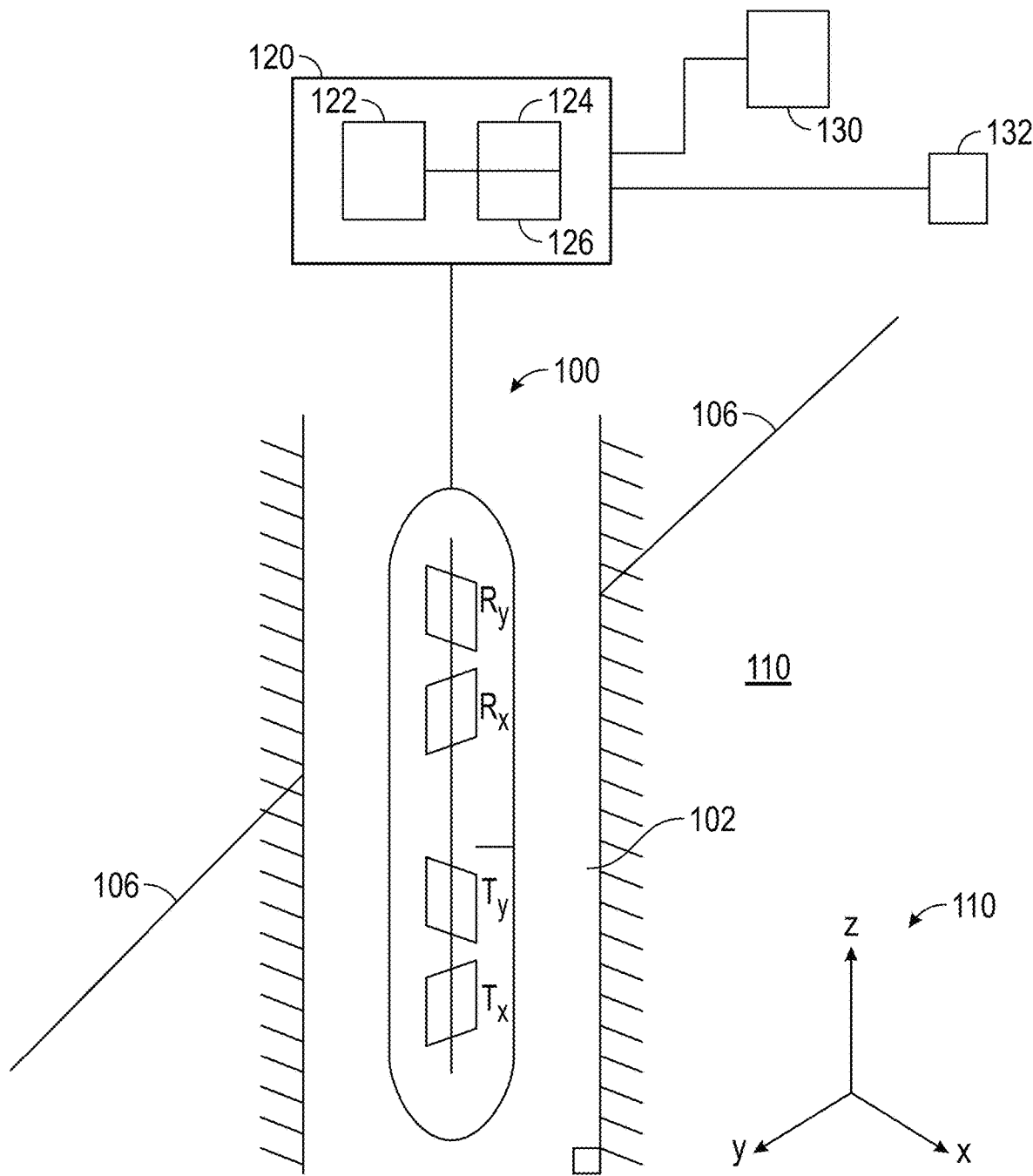
FIG. 1 shows a wireline tool for deep shear wave acoustic imaging.

Referring to FIG. 1, a wireline tool 100 for deep shear wave acoustic imaging is shown. The wireline tool 100 is lowered into a borehole 102 within a formation 104. A coordinate system 110 shows body-centered axes for the wireline tool 100. The formation 104 can have one or more planar geological structures 106 therein, such as a bed boundary, fracture or fault. The wireline tool 100 includes a plurality of acoustic transmitters and a plurality of acoustic receivers oriented along various axes. In one embodiment, the wireline tool 100 includes a first acoustic transmitter $T_x$ oriented along an x-axis and a second acoustic transmitter $T_y$ oriented along a y-axis, as well as a first acoustic receiver $R_x$ oriented along the x-axis and a second acoustic receiver Ry oriented along the y-axis. In another embodiment, the wirelines tool includes 8 transmitter receiver pairs.

The wireline tool 100 is in communication with a control unit 120 that includes a processor 122 and a memory storage device 124. The memory storage device 124 has stored thereon one or more computer programs or instructions 126 that, when read by the processor 122, enable the processor 122 to perform the methods disclosed herein for data acquisition and presentation. In particular, the computer programs or instructions 126 enable the processor 122 to present a three-dimensional graphic display of deep shear wave imaging data as discussed herein. The graphic display can be shown at a monitor 130 in communication with the control unit 120. An input/output device 132 such as a keyboard and/or a computer mouse can be used to enter data by a user.

As a transmitter (e.g., $T_x$) is energized, acoustic waves are propagated into the formation 104 to reflect off of the geological structure 106. The reflection can be received by either of the receivers ($R_x$, $R_y$). For the illustrative embodiment having two orthogonal transmitters and two orthogonal receivers, a combination of four different components of acoustic measurements are possible. As the wireline tool 100 is lowered through the borehole. The acoustic signals can be reflected from a top of the geological structure 106 or the bottom of the geological structure 106. These reflections can be migrated to obtain an image of the formation's structural features at a distance away from the borehole 102. By rotation of the tool or by mathematical rotation of the received data, imaging can be performed in a number of imaging planes having different azimuth angles.

Figure 2:
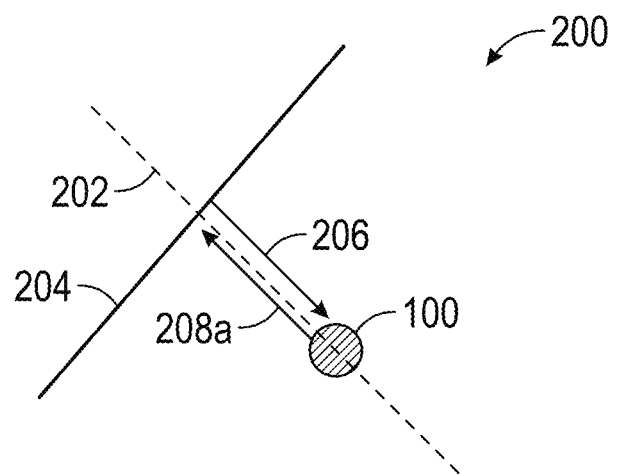
FIG. 2 shows the effects of angular incidence of an acoustic wave at a geological structure on the strength of the reflection signal.
Figure 2:
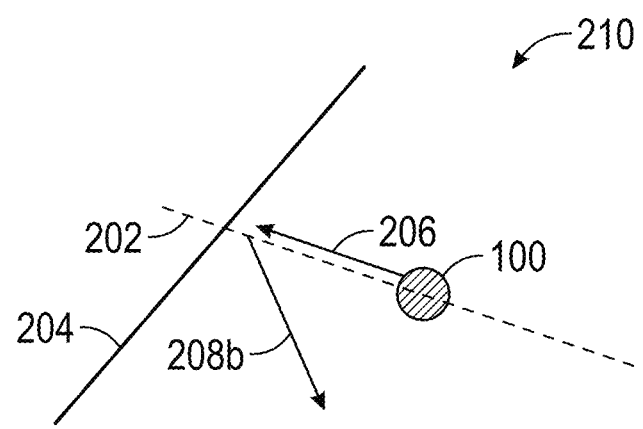

FIG. 2 shows effects of angular incidence of an acoustic wave at a geological structure on the strength of the reflection signal. In a first scenario 200, an imaging plane 202 is perpendicular to a geological structure 204. Imaging plane 202 is a plane that passes through the wireline tool 100. An acoustic wave 206 from the wireline tool 100 propagates within the imaging plane 202. Thus, the acoustic wave 206 impinges perpendicularly on the geological structure 204, cause a reflection 208a of the acoustic wave 206 to be directed back to the wireline tool 100, resulting in a strong reflection signal. In a second scenario 210, the imaging plane 202 is not perpendicular to the geological structure 204. Therefore, the acoustic wave 206 impinges on the geological structure 204 at a non-perpendicular angle, resulting in a reflection 208b that is directed a side of the wireline tool 100, resulting in a weak reflection signal.

Figure 3:
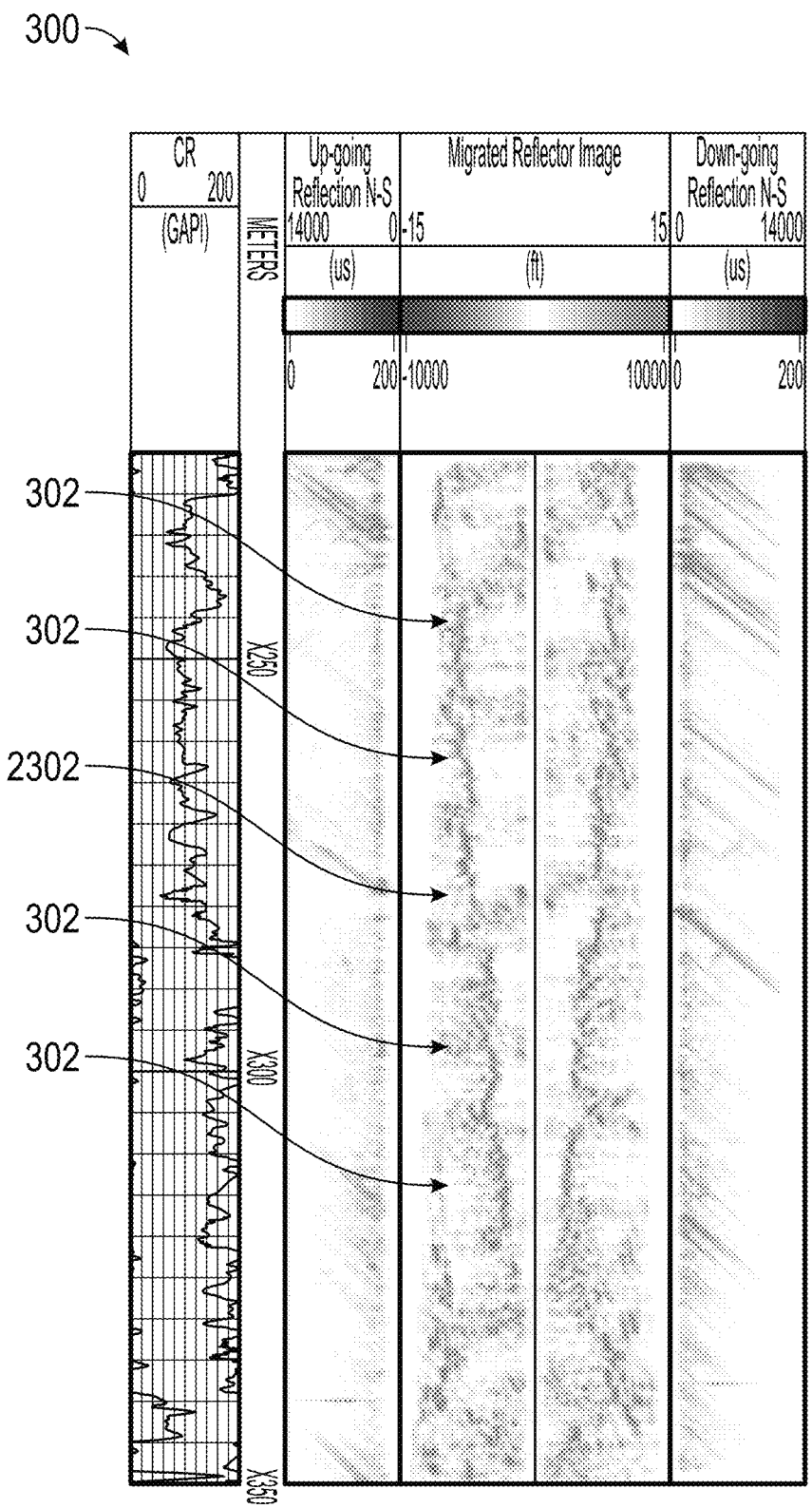
FIG. 3 shows a two-dimensional view of an image plane of acoustic data obtained from the acoustic transmitters and receivers of the wireline tool of FIG. 1.

FIG. 3 shows a two-dimensional view 300 of an image plane of acoustic data obtained from the acoustic transmitters and receivers of the wireline tool 100 of FIG. 1. The acoustic data can be deep shear wave imaging data and is shown along a single two-dimensional plane and over a plurality of depths. The intensity or amplitude of a data point indicates the strength of a reflection signal at the receivers. The darker regions 302 indicate a presence of a geological structure and are due to the image plane being perpendicular to the geological structure. Since the acoustic data is three-dimensional, when presenting only a two-dimension image, a majority of the data obtained by the acoustic transmitters and receivers is not visualized, leading to a loss of information.

Figure 4:
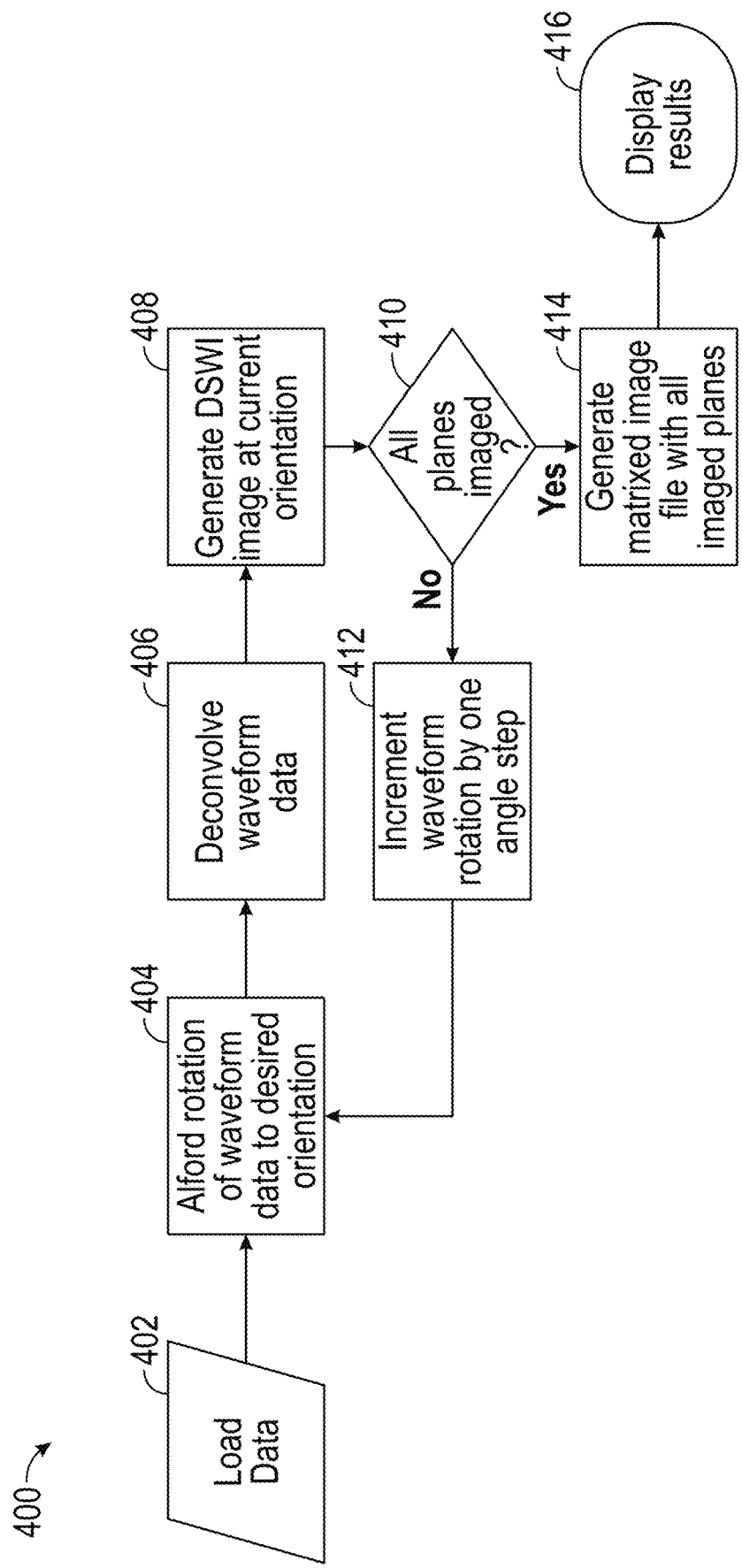
FIG. 4 shows a flowchart illustrating a method for three-dimensional presentation of a deep shear imaging data.

FIG. 4 shows a flowchart 400 illustrating a method for three-dimensional presentation of a deep shear imaging data. In various embodiments, the method can be performed on the processor 122 of FIG. 1. In box 402, data is loaded into the processor or the memory storage device 124. The data includes the acoustic data obtained from the wireline tool 100. The data can also include a selection of a number of image planes and/or a selection of azimuthal directions for the image planes. In various embodiments, image planes are separated by a selected angle step. Thus, 36 image planes may be angularly separated by 10 degrees about the longitudinal axis of the wireline tool 100. In various embodiments, the method generates 360 image planes, with adjacent image planes being separated by 1 degree.

In box 404, an orientation of a plane for presentation of the data is selected and a rotation is performed on the data to project the data into the plane at the selected orientation. In various embodiments, the rotation is an Alford rotation that projects formation shear data recorded in any two orthogonal directions into the fast and slow shear directions in the presence of shear-wave anisotropy. In box 406, the rotated waveform data is deconvolved in order to sharpen the image. In box 408, deep shear wave imaging (DWSI) data is generated at the selected orientation from the deconvolved data.

In box 410, the processor determines whether all of the image planes have been generated or if there are any azimuthal directions for which an image plane has yet to be generated. If not all of the image planes have been generated, the processor proceeds to box 412. In box 412, the processor increments the waveform rotation by one angle step. The method then returns to box 404 at which the Alford rotation is performed using the new angle step. Returning to box 410, if all image planes have been generated, the method proceeds to box 414. In box 414, the image planes are combined in a matrixed image file. In box 416, the results of the image planes are shown at a display.

Figure 5:
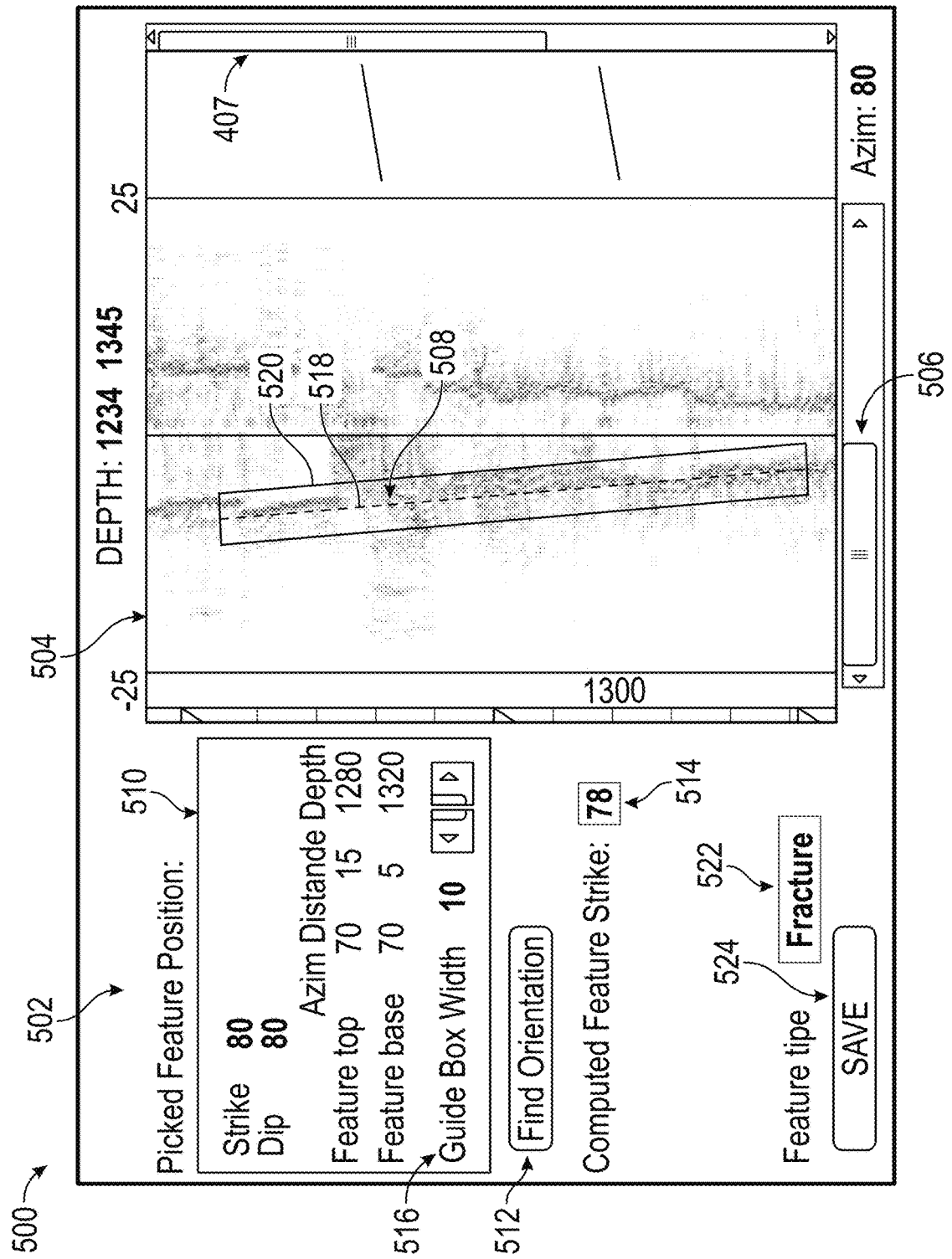
FIG. 5 shows an illustrative display for showing the plurality of image planes generated by the method detailed in the flowchart of FIG. 4.

FIG. 5 shows an illustrative display 500 for showing the plurality of image planes generated by the method detailed in the flowchart 400 of FIG. 4. The display 500 can be shown at monitor 130 of FIG. 1. The display 500 provides a control panel 502 that displays user input and other data and a display area 504 for presenting the data. The control panel 502 includes a slider bar 406 that allows the user to rotate through the image planes. Another slider bar 407 is used to control the depth region that is shown at the display area 504. The display area 504 shows illustrative data that is being displayed from a depth of 1234 meters to a depth of 1345 meters and at a radial distance of about 25 meters from the borehole 102.

The user can select a feature in the display area 504 as indicated by feature 508 to determine further information about the feature 508. The user can select the feature 508 and indicate to the processor a guide box width 516 for searching for strong amplitude reflections. In the illustrative example, the user has drawn a guide line 518 and a selected guide box width of 10. The processor 122 therefore searches for strong amplitude reflections within guide box 520 having the dimensions related to the selected guide line 561 and guide box width 516.

Once the feature 508 is selected, the processor 122 can determine parameters of the selected feature 508 and display the parameters 510 at the control panel 502. For example, feature 508, feature has as a strike angle of 80 degrees and a dip angle of 80 degrees. The top of feature 508 is at an azimuth angle of 70 degrees and is located at a distance of 15 meters from the borehole and at a depth of 1280 meters. Also, the bottom of the feature 508 is at an azimuth angle of 70 degrees and is at located at a distance of 5 meters from the borehole and at a depth of 1320 meters. The processor 122 can also search the plurality of images to find an image plane for which a maximum reflection amplitude occurs for the selected feature 508. In particular, when the user selects "Find Orientation", the processor 122 locates the maximally reflective image plane and displays its orientation 514. The user can also enter a feature type 522 and save the image displayed in the display area 504 as well as the related parameters to the memory storage device (124, FIG. 1) by selected the "Save" button 524.

It is to be understood that particular number and values for depths, angles, etc. shown in FIG. 5 are only for illustrative purposes and are only approximate values. They are not meant to be a limitation on the invention.

Figure 6B:
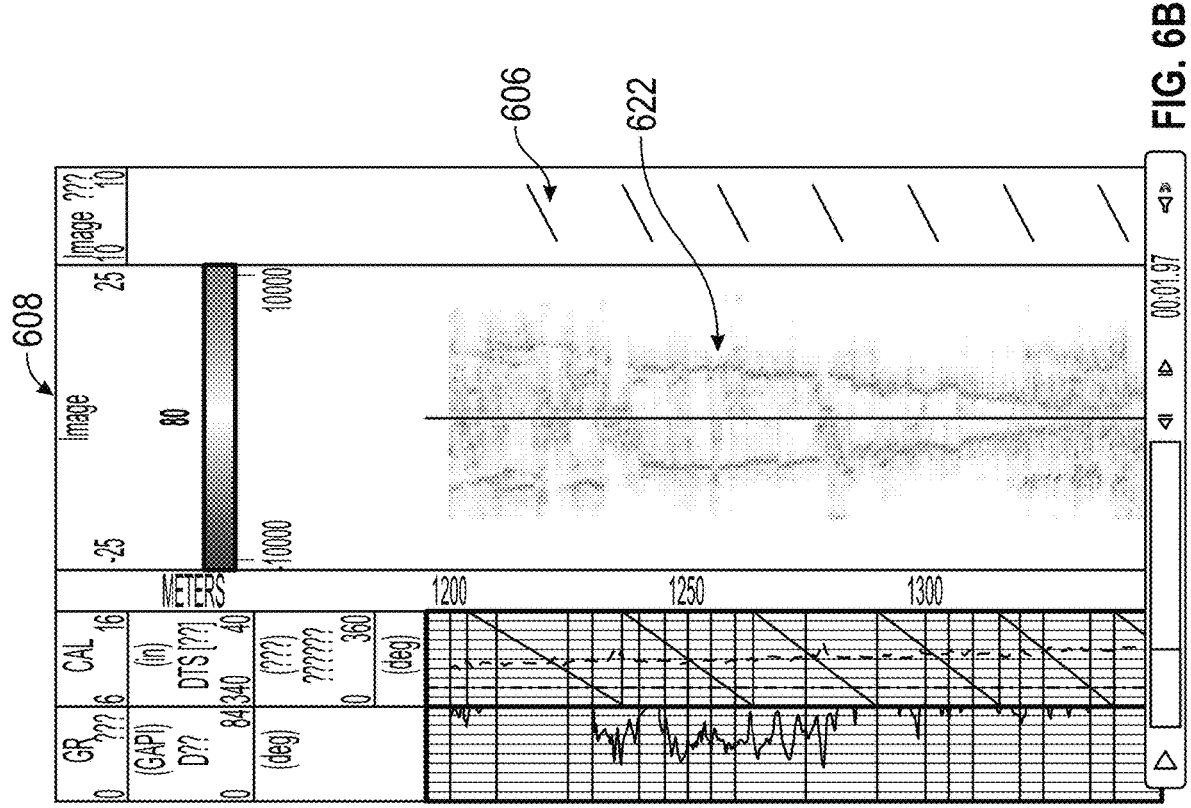
FIGS. 6A-6D shows image planes generated from the acoustic data at various azimuth angles.
Figure 6A:
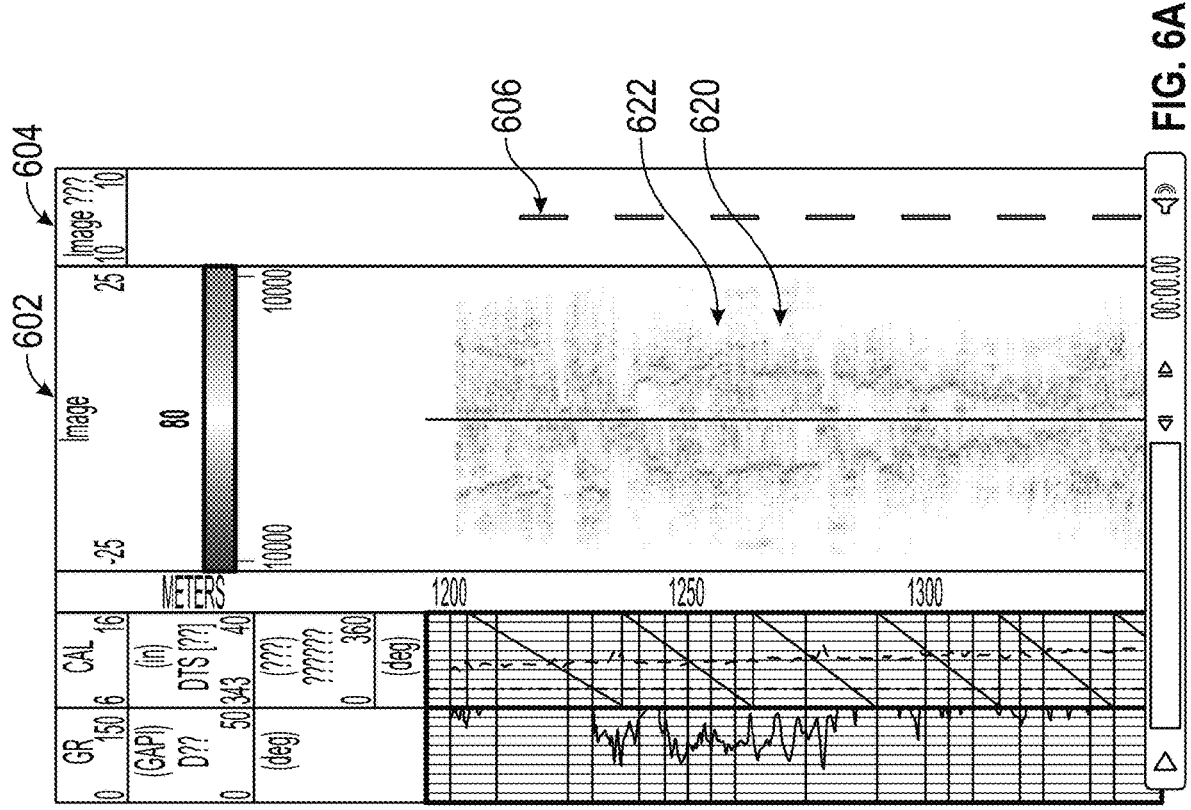

FIGS. 6A-6D shows image planes generated from the acoustic data at various azimuth angles. FIG. 6A shows an image plane 602 at a selected angle. For purposes of illustration the angle of image plane 602 is selected to be zero degrees. The image plane 602 is accompanied by a rotation track 604 that includes a stick 606 that shows the user the orientation direction of the image plane 602. The stick 606 rotates around an axis sticking out of the page and represents the image plane as seen looking along a longitudinal axis of the borehole.

FIG. 6B shows an image plane 608 at an azimuth angle of about 45 degrees as indicated by the orientation of stick 606. Similarly FIG. 6B shows an image plane 410 at an azimuth angle of about 90 degrees as indicated by the approximately horizontal orientation of stick 606, and FIG. 6D shows an image plane 612 at an azimuth angle of about 135 degrees as indicated by the orientation of stick 606.

Figure 6C:
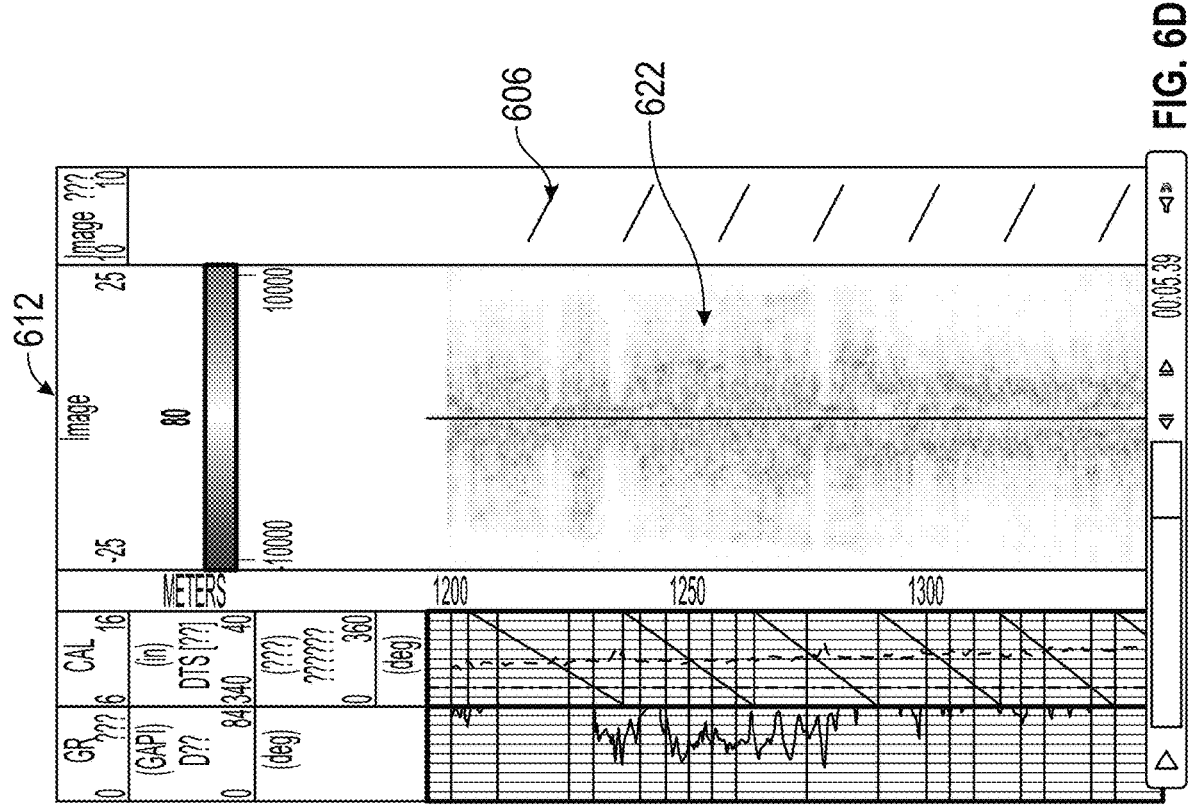
Figure 6D:
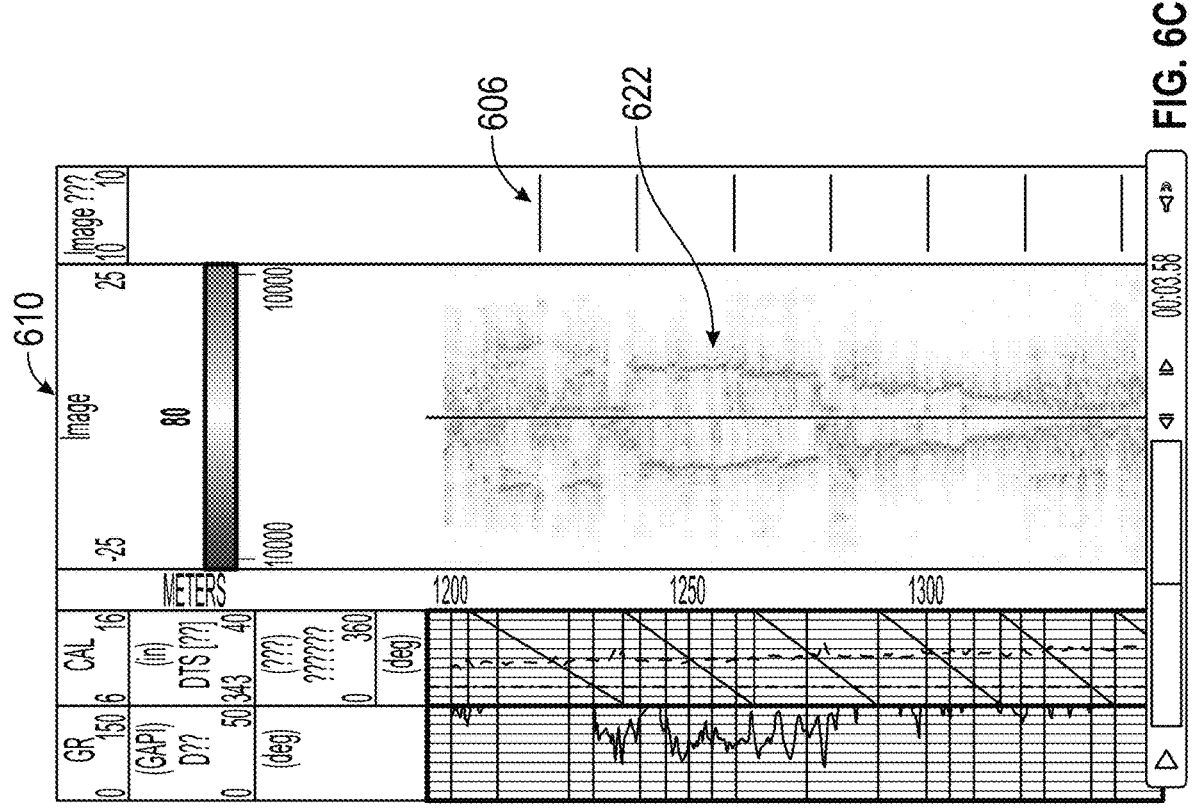

Referring to FIGS. 6A-6D, FIG. 6A shows various strong signals 622 in reflection areas related to a geological structure as well as weak signals 620 related to weak reflection areas. A maximum reflection or a strong reflection area is shown in areas in which the imaging plane is perpendicular to the geological structure. FIG. 6B shows a cleaner strong signal 622, while the weaker signals are diminishes and becoming more infrequent, indicating that most of the image plane in FIG. 6B is perpendicular to the geological structure. FIG. 6C shows a similar signal display as in FIG. 6B, indicating that the geological structure is in an angular location somewhere between the 45 degree angle of FIG. 6B and the 90 degree angle of FIG. 6C. In FIG. 6D, strong signals 622 are poorly defined, indicating that the geological structure is not in the angular direction of 135 degrees.

By review of the image planes, parameters such as the direction or orientation as well as location, size and depth of various geological structures can be determined and the geological structures of the formation evaluated. With these parameters known, a drilling operation can be performed in the formation based on the parameters in order to affect a drilling direction or drilling speed. For example, based on the parameters of the geological structure, the drilling operation can be performed to drill either towards or away from the geological structure.

Set forth below are some embodiments of the foregoing disclosure:

Embodiment 1: A computer-implemented method of evaluating a formation, the method comprising: obtaining acoustic data from a plurality of acoustic transmitters and acoustic receivers in the formation; projecting the acoustic data into a plurality of image planes; selecting a feature in one of the image planes; scrolling through the plurality image planes to determine the three-dimensional structure of the feature; and drill the formation based on the three-dimensional structure of the feature.

Embodiment 2: The method as in any prior embodiment, wherein the image planes are separated by a selected angular separation.

Embodiment 3: The method as in any prior embodiment, wherein the angular separation in one degree.

Embodiment 4: The method as in any prior embodiment, further comprising determining at least one of an orientation and a location of the feature.

Embodiment 5: The method as in any prior embodiment, wherein determining an orientation of the feature further comprises determining an azimuthal location of a top of the feature and a bottom of the feature.

Embodiment 6: The method as in any prior embodiment, wherein determining a location of the feature further comprises determining a distance of a top of the feature to a borehole and a distance of a bottom of the feature to the borehole.

Embodiment 7: The method as in any prior embodiment, further comprising selected from the plurality of image planes an image plane having a maximum reflection amplitude for the selected feature.

Embodiment 8: A system for evaluating a formation, comprising: a plurality of acoustic transmitters and acoustic receivers; and a processor configured to: project the acoustic data obtained from the plurality of acoustic transmitters and acoustic receivers into a plurality of image planes, select a feature in one of the image planes, scroll through the plurality image planes to determine a three-dimensional structure of the feature, and drill the formation based on the three-dimensional structure of the feature.

Embodiment 9: The system as in any prior embodiment, wherein the image planes are separated by a selected angular separation.

Embodiment 10: The system as in any prior embodiment, wherein the angular separation in one degree.

Embodiment 11: The system as in any prior embodiment, wherein the processor is further configured to determine at least one of an orientation and a location of the feature.

Embodiment 12: The system as in any prior embodiment, wherein determining an orientation of the feature further comprises determining an azimuthal location of a top of the feature and a bottom of the feature.

Embodiment 13: The system as in any prior embodiment, wherein determining a location of the feature further comprises determining a distance of a top of the feature to a borehole and a distance of a bottom of the feature to the borehole.

Embodiment 14: The system as in any prior embodiment, wherein the processor is further configured to select from the plurality of image planes an image plane having a maximum reflection amplitude for the selected feature.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A computer-implemented method of evaluating a formation, comprising:
obtaining acoustic data from a formation at image planes at a plurality of azimuthal locations around a borehole in the formation using a plurality of acoustic transmitters and acoustic receivers in the borehole, the formation including a geological feature;
projecting the image planes at the plurality of azimuthal locations at a display;
selecting the geological feature in one of the image planes at the display;
scrolling through the image planes at the display to determine a three-dimensional structure of the geological feature; and
drilling the formation based on the three-dimensional structure of the geological feature.

2. The method of claim 1, wherein the image planes are separated by a selected angular separation.

3. The method of claim 2, wherein the angular separation is one degree.

4. The method of claim 1, further comprising determining at least one of an orientation and a location of the geological feature.

5. The method of claim 4, wherein determining an orientation of the geological feature further comprises determining an azimuthal location of a top of the geological feature and a bottom of the geological feature.

6. The method of claim 4, wherein determining a location of the geological feature further comprises determining a distance of a top of the geological feature to a borehole and a distance of a bottom of the geological feature to the borehole.

7. The method of claim 1, further comprising selecting from the image planes an image plane having a maximum reflection amplitude for the selected geological feature.

8. A system for evaluating a formation, comprising:
a plurality of acoustic transmitters and acoustic receivers disposed in a borehole in the formation for obtaining acoustic data from the formation at image planes at a plurality of azimuthal location around the borehole, the formation including a geological feature; and
a processor configured to:
projecting the image planes at the plurality of azimuthal locations at a display;
select the geological feature in one of the image planes at the display,
scroll through the image planes at the display to determine a three-dimensional structure of the geological feature, and
drill the formation based on the three-dimensional structure of the feature.

9. The system of claim 8, wherein the image planes are separated by a selected angular separation.

10. The system of claim 9, wherein the angular separation is one degree.

11. The system of claim 8, wherein the processor is further configured to determine at least one of an orientation and a location of the geological feature.

12. The system of claim 11, wherein determining an orientation of the geological feature further comprises determining an azimuthal location of a top of the feature and a bottom of the feature.

13. The system of claim 11, wherein determining a location of the feature further comprises determining a distance of a top of the geological feature to a borehole and a distance of a bottom of the feature to the borehole.

14. The system of claim 8, wherein the processor is further configured to select from the plurality of image planes an image plane having a maximum reflection amplitude for the selected geological feature.

15. The method of claim 1, wherein the image file is shown at a display, further comprising controlling a rotation through the image planes of the image file using a slider bar at a control panel of the display.

* * * * *